United States Patent [19]

Kessel et al.

[11] Patent Number: 5,008,810
[45] Date of Patent: Apr. 16, 1991

[54] SYSTEM FOR DISPLAYING DIFFERENT SUBSETS OF SCREEN VIEWS, ENTERING DIFFERENT AMOUNT OF INFORMATION, AND DETERMINING CORRECTNESS OF INPUT DEPENDENT UPON CURRENT USER INPUT

[75] Inventors: William C. Kessel, Watertown; John L. Laclaire, Cambridge; Andrew L. Lui, West Newton; Michael H. Locke, Lakeville; Herbert I. Britt, Cambridge, all of Mass.

[73] Assignee: Process Modeling Investment Corp., Wilmington, Del.

[21] Appl. No.: 251,514

[22] Filed: Sep. 29, 1988

[51] Int. Cl.$^5$ .................. G06F 15/403; G06F 15/46
[52] U.S. Cl. .................. 364/200; 364/221.1; 364/237.3; 364/261.2; 364/259.2; 364/286.2; 364/513; 364/521; 364/191
[58] Field of Search ... 364/200 MS File, 900 MS File, 364/300, 578, 188, 191, 513, 518, 521

[56] References Cited

U.S. PATENT DOCUMENTS

| | | | |
|---|---|---|---|
| 4,383,298 | 5/1983 | Huff et al. | 364/300 |
| 4,591,989 | 5/1986 | Tanka | 364/474 |
| 4,656,603 | 4/1987 | Dunn | 364/900 |
| 4,658,370 | 4/1987 | Erman et al. | 364/900 X |
| 4,677,587 | 6/1987 | Zemany, Jr. | 364/900 |
| 4,785,408 | 11/1988 | Britton et al. | 364/300 X |
| 4,788,636 | 11/1988 | Shiratori et al. | 364/191 |
| 4,792,889 | 12/1988 | Kragelin et al. | 364/191 |
| 4,821,211 | 4/1989 | Torres | 364/521 |
| 4,843,538 | 6/1989 | Lane et al. | 364/188 |
| 4,851,999 | 7/1989 | Moriyama | 364/900 X |
| 4,862,345 | 8/1989 | Lekron | 364/188 |
| 4,873,623 | 10/1908 | Lane et al. | 364/188 |
| 4,873,643 | 10/1989 | Powell et al. | 364/468 |

OTHER PUBLICATIONS

PRO/II Graphics User Guide by SimSci, pp. 5.1-5.19, 8.1-8.9 and 11.1-11.17, Jun. 1988.
PRO/II PC Version by Simulation Sciences, Inc., brochure, 1988.
DESIGN II, brochure by ChemShare, Sep. 1985.
Brochure on DesignPFD by ChemShare, Apr. 1988.
PRO/II brochure by Simulation Sciences, Inc., 1988.

Primary Examiner—Thomas C. Lee
Attorney, Agent, or Firm—Hamilton, Brook, Smith & Reynolds

[57] ABSTRACT

An input software system is used to provide input to a process simulation software device. The input software system includes an expert system which guides the user step by step through required and optional input to successfully create a flow sheet model. The expert system prevents model overspecification and logically inconsistent specifications. The expert system checks for completeness of the model specification and the reasonableness of parameter values.

20 Claims, 17 Drawing Sheets

DEFINE THE PROBLEM

TITLE 'SAMPLE PROBLEM TO TEST SENSITIVITY PARAGRAPH'
DESCRIPTION "THIS FILE WILL BE USED TO CHECK OUT THE
    SENSITIVITY PARAGRAPH"
RUN-CONTROL MAX-TIME=250

SELECT UNITS OF MEASUREMENT

IN-UNITS ENG
OUT-UNITS ENG

SPECIFY THE COMPONENTS

COMPONENTS $H_2$ HYDROGEN/ $N_2$ NITROGEN/ $C_1$ METHANE/
    $B_2$ BENZENE/ CH CYCLOHEXANE

;          SPECIFY PHYSICAL PROPERTY METHODS AND MODELS
;
PROPERTIES SYSOP3
;
;
;          SPECIFY PLOT OPTIONS
;
PLOT-OPTIONS GRID=YES WIDE=YES INTERPOLATE=NO
;
;
;          SPECIFY FLOWSHEET CONNECTIVITY
;
FLOWSHEET
;    BLOCK FLASH  IN=IN  OUT=OUT1 OUT2
;
;          SPECIFY FEED STREAM
;
STREAM IN TEMP=100 PRES=14.7 MOLE-FLOW=300
    MOLE-FRAC $H_2$ .2/ $N_2$ .2/ $C_1$ .2/ BZ .2/ CH .2
;
;          SPECIFY BLOCK DATA
;
BLOCK FLASH FLASH2
    PARAM TEMP=100. PRES=15.
;
;
;                                                    \ 11

*Fig.* 1

```
SENSITIVITY BLOCK1
    DESCRIPTION 'TEST OF SENSITIVITY WITH PLOTS'
    DEFINE FVAP STREAM-VAR STREAM=OUT1 VARIABLE=
        MOLE-FLOW
    DEFINE FLIQ STREAM VAR STREAM=OUT2 VARIABLE=
        MOLE-FLOW
    TABULATE 3 'FVAP' COL-LABEL='VAPOR' 'FLOW' 'STREAM'
        'OUT1'
    TABULATE 4 'FLIQ' COL-LABEL='LIQUID' 'FLOW' 'STREAM'
        'OUT2'
    VARY BLOCK-VAR BLOCK=FLASH SENTENCE=PARAM
        VARIABLE=TEMP RANGE LIST=80 90 100 110 120
```

```
IWP ASPENPLUS EDIT        Directory C:\IWPSYS              RunID: TEST
                             STREAM Menu
              Select item or press F4 for next required input STREAM IDs
 *S1           S2            S3

STREAM Types
 *MATERIAL     HEAT          WORK

# Complete   * Incomplete   r Results available   e Results with errors
              Use cursor keys to move through menu. Use Enter key to select ┌─Optional────────────────────────────────────────────────────────────────┐
│ Free Water                       Nphase  [2]         Phase              │
│ Flash-Option  [FLASH]            Maxit   [30]        Tol   [0.0001]     │
└─────────────────────────────────────────────────────────────────────────┘

F1: Help/IWP    F2: Field Edit    F3: Browse Input/Results   F4: Next    F5: List
F6: Services    F7:               F8: Edit Menu              F9: Prev Menu  F10: Cmnd
>Select STREAM ID, or STREAM type to list STREAMs of that type
>STREAM
```

```
IWP ASPENPLUS EDIT         Directory C:\IWPSYS              Run ID: TEST
                              ——BLOCK Menu——
              Select item or press F4 for next required input BLOCK IDs
  *B1
BLOCK Types
  MIXER      FLASH2      DISTL        RYIELD     COMPR
  FSPLIT     FLASH3     *RADFRAC      REQUIL     MULTI
  SEP        HEATX       ABSBR        RCSTR      DUPL
  SEP2       MHEATX      EXTRACT      RPLUG
  HEATER     DSTWU       RSTOIC       PUMP

# Complete   * Incomplete   r Results available   e Results with errors
       Use cursor keys to move through menu. Use Enter key to select
                                              Nphase   [2]    Phase
  Free Water                                   Maxit   [30]   Tol   [0.0001]
  Flash-Option [FLASH]

F1: Help/IWP   F2: Field Edit   F3: Browse Input/Results   F4: Next    F5: List
F6: Services   F7:              F8: Edit Menu              F9: Prev Menu   F10: Cmnd
>Select BLOCK ID, or BLOCK type to list BLOCKs of that type
>BLOCK
```

Fig. 2f

```
IWP ASPENPLUS EDIT                    RunID: TEST
ID: RAD1        Description      Directory C:\IWPSYS
Inlets: S1                              Units: ENG
Outlets: BOTTOMS DISTLT                 Nstage: 10
```

29 →

Nstage 10
Algorithm STANDARD                Radfrac Main
                       MOLE -RDV 1.5        RW   Init-Option STANDARD
                       New-3 Phase NO   Absorber NO
Enter two; see form help for combinations allowed MOLE -D        LBMOL/HR
MOLE -B        LBMOL/HR              D:F      BTU/HR
MOLE -L1       LBMOL/HR              B:F      BTU/HR
MOLE VN        LBMOL/HR              Q1
MOLE RR                               QN
MOLE BR Optional subcooled reflux spec
Subcooled                              Optional basis for D:F and B:F
Degsub      F                          Streams
Temp        F                          Comps 31 →
Value is out of range: it must be between 0 and 1
> Distillate vapor fraction. RDV = DV/D. 0 for total condensers;
> 0 <RDV <=1 for partial condensers

| IWP ASPENPLUS EDIT | Directory C:\IWPSYS | Run ID: LFD |
|---|---|---|
| ID: B2  Description: | | |
| Inlets: S3  Work: | | |
| Outlets: S4  Work: | | Units: ENG |

——————— Pump. Main ———————

— Enter one of the following parameters —

Pres [ ] [PSI]     Delp [ ] [PSI]
Power [ ] [HP]    Pratio [ ]

— Optional —

Eff [ ]    Nphase [1]    Maxit [30]    F4: Next
Deff [ ]                  Tol [0.0001]

F1: Help/IWP   F2: Field Edit   F3: Browse Input/Results   F4: Next   F5: List
F6: Services   F7:              F8: Edit Menu              F9: Prev Menu   F10: Cmnd
>Pressure difference. If greater than 0- for pumps; if less than 0- for
>turbines

SYSTEM FOR DISPLAYING DIFFERENT SUBSETS OF SCREEN VIEWS, ENTERING DIFFERENT AMOUNT OF INFORMATION, AND DETERMINING CORRECTNESS OF INPUT DEPENDENT UPON CURRENT USER INPUT

BACKGROUND OF THE INVENTION

In process engineering, the use of computer based models to develop and evaluate new processes, design and retrofit plants, and optimize the operation of existing plants is rapidly becoming a standard. At every stage of process design, development and operation, rigorous models generated by process simulation software systems can be used to make better engineering and business decisions.

In a process simulation software system the performance of a process industry plant in which there is a continuous flow of materials and energy through a network of process units is simulated. Typically, the process simulation software features computer models which allow process engineers to simulate the operation of various pieces of equipment used in a proposed or existing manufacturing process. The end results from the simulation software system provide a showing of the simulated performance of the plant under various conditions and an estimate of the capital and operating costs of the plant and its profitability.

The ultimate result of the process simulation is a shortened design process and often an improved design in addition to other benefits depending on the stage of process development. For an existing plant, simulation is used to improve the operation, to reduce raw material and energy requirements and to de-bottleneck the process. In research and development, the simulation output is used to study alternative processing schemes, to scale-up the process, and to interpret pilot plant data. For the design of a new plant, the computer based models are used to optimize the design and reduce capital and operating costs. In addition, the simulation reduces the start-up risks for companies that produce high performance, high profit products such as food additives and specialty chemicals. For example, if a company is in the petrochemical business, there are numerous engineering calculations that must be made in determining what type and size of equipment should be used, and what mixture of feed stocks should be used in the manufacturing process. The process simulation system enables the chemical engineer to perform those calculations under many different conditions.

The foregoing benefits provide substantial economic savings from bringing new products to market faster, from designing plants that require less capital investment and cost less to operate, and from reducing manufacturing costs in existing facilities.

In order to use a process simulation system, generally a user first sketches a flowsheet diagram or description of the desired manufacturing process. From that information, the user inputs into the computer the feed stream composition and flows, major equipment items in the plant, and the interconnections between pieces of equipment that result in the flow of materials or energy between process units. From the input, the computer translates the data into a specially formatted computer file, runs the simulation software program on the computer file and generates a report. The report shows the simulated performance of the plant, including the composition, flow and properties of all internal and product streams, and size and performance of individual process units. A report can also be produced to estimate complete project economics, capital and operating costs of the plant and profitability.

The information that the user inputs to the computer from his initial flowsheet diagram is often complex and lengthy extending from chemical components, to physical properties and operating specifications of individual model units, to parameters of chosen pieces of equipment, and inlet stream variables. Dependencies between specified elements and disallowed combinations often become lost in the voluminous and complex information. Hence, a major problem with the use of rigorous computer based models has been the time and effort required for process engineers to prepare the input and correctly specify all the information and data required. The use of the input language by its nature requires knowledge and experience to use it most effectively. Thus, the process engineer has to make frequent reference to the input manual particularly when learning how to use the simulation system or resort to overly simplistic models which greatly underutilizes the potential of the process simulation software system.

Accordingly, there is a need to aid process engineers in providing correct input to process simulation software systems.

SUMMARY OF THE INVENTION

The present invention provides an input system to aid process engineers in fully utilizing process simulation software systems. The input system comprises an interactive computer program. An expert system embodied in the interactive computer program guides the process engineer in specifying a desired computer based model process and prevents overspecification and inconsistent specifications from occurring. After simulation of the specified model, results from the simulation are stored in a convenient personal data base on the engineer's workstation.

In particular, the input system of the present invention comprises a first software routine for display coupled to a computer processor for generating on a video display a ordered series of menus and input forms. Each menu has various prompts which direct the user to a succeeding menu and/or ultimately to an input form. Each input form has a plurality of input fields in which the user inserts desired input data which represent specifications of elements of the desired process model. Each input form also provides prompts to the user corresponding to the input fields. The prompts of each form and menu change as a function of the input data inserted by the user on each input form.

For each user insertion of input data, the computer processor determines a current state of completeness and correctness of the inserted input data with respect to the input field into which the input data was inserted and previously inserted input data. Upon acceptable input data being inserted into the input fields of each form, the computer processor generates a complete input file to be executed error free by a process simulation system and hence a complete state.

A second software routine for display coupled to the computer processor generates on the display a changeable subset of the series of ordered menus and input forms in response to a current state of incompleteness determined by the computer processor. The menus of the subset direct the user to the input forms of the subset, and the input forms of the subset provide to the user input fields with corresponding prompts to insert input data necessary for generating a complete input file. The computer processor determines the current state of completeness/incompleteness for each insertion of input data on a form, and the second software routine or display changes the subset of menus and forms in response to each determination of the current state of completeness/incompleteness by the computer processor.

In accordance with another aspect of the present invention, the input system further comprises a mechanism (software routine) for providing, on user command, an indication of possible acceptable input data with respect to an input field. In a preferred embodiment, the mechanism for providing an indication provides a listing of predefined acceptable input data with respect to the input field, and also, provides a recall mechanism for recalling previously inserted input data which the user may use for acceptable input data with respect to an input field.

In accordance with another aspect of the present invention, the input system may include a trace mechanism coupled to the input data inserted by the user. The trace mechanism compares newly inserted input data with previously inserted input data to prevent overspecification and/or inconsistent specification. In either case, the trace mechanism provides for the newly inserted input data to replace related previously inserted input data as a result of the comparison.

In a preferred embodiment, the computer processor generates on each menu and each input form an indication of the current state of completeness. In addition, where the computer processor determines currently inserted input data to be incorrect (e.g. inconsistent), the computer processor discards the currently inserted input data and generates an indication of the incorrectness on the displayed input form to inform the user that the currently inserted input data is incorrect. The computer processor may also prevent inconsistent input data from being inserted by the user by disallowing insertion of input data into certain input fields depending on input data previously inserted in other input fields. In a preferred embodiment, the computer processor dims and "locks" certain input fields, that is, prevents input data from being inserted into those input fields, depending on previously inserted input data in other input fields.

In light of the series of ordered menus and input forms provided by the interactive program of the present invention, the input system of the present invention may be thought of as a device which provides a format for user entry of desired data to form a complete input file. Each screen view generated on the video display, whether a menu or an input form, provides to the user a state of completeness and common language prompts directing the user through the format in an error eliminating manner. It is the use of this format and the associated automatic error checking which simplifies the process of correctly specifying a desired computer based model process to be simulated by a simulation software system.

BRIEF DESCRIPTION OF THE DRAWINGS

FIG. 1 is an illustration of an input file describing a desired process model to be simulated by a process simulation system.

FIGS. 2a-2j are illustrations of screen views generated by an interactive program embodying the present invention for forming the input file of FIG. 1.

DETAILED DESCRIPTION OF THE PREFERRED EMBODIMENT

Figure 8:
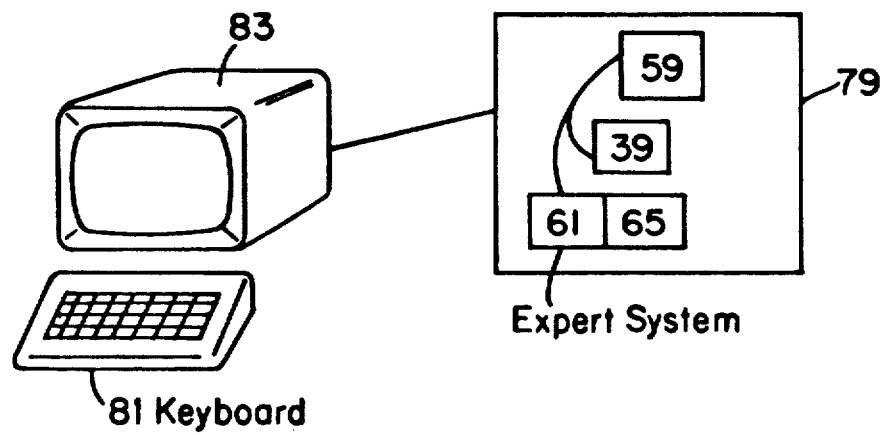
FIG. 8 is a system diagram of the process simulation system.

As hereinafter described, the present invention is intended to be used with a computerized simulation system supported by digital processing means 79 (FIG. 8) such as a mainframe or personal computer. Typically, a user communicates to the processing means 79 through a keyboard 81 and the like and is provided with a screen view on a video display monitor 83 or the like. In particular, a cursor or other marker as is common in the art is displayed in each screen view. The cursor is user moveable by keys on the keyboard 81 or by other known means. Upon user positioning of the cursor on a screen view item, the item is highlighted or otherwise emphasized to provide the user with an indication of the item to which his next command will correspond. Generally, selection of an item or insertion of input data into a displayed input field is accomplished by the positioning of the cursor over the item or input field and the subsequent operation of a key, such as an Enter or Return key or alphanumeric keys on the keyboard 81. Other arrangements, such as the use of a mouse and/or menu for making selections and the like may be used in lieu of or in combination with the keyboard 81.

An illustration of an input file 11 specifying a model of a desired process to be simulated through computer simulation means is illustrated in FIG. 1. The input file 11 describes the specifications of elements of the model process in a paragraph by paragraph manner. Each paragraph is interpreted by the simulation system as a data record which describes one element of the model process.

As is noticeable by first sight, consistency of one element with respect to the specifications of other elements is not easily viewable. Hence, in manually composing such an input file the user commonly overlooks various inconsistencies within and between elements. As a result, inconsistent specifications are made in the input file and the simulation system is unable to execute the input file to produce the desired simulation. In the same light, overspecification from element to element by the user also easily occurs due to the size, complexity and great amount of information held within the input file. Overspecification results in the same inability of the simulation system to execute the desired simulation of a user specified model process.

The present invention provides means for forming an input file to specify a desired model process to be simulated by a simulation software system without the overspecification and specification inconsistencies errors known in present methods of forming an input file. Error free specification of a model process is accomplished by the present invention through an interactive program 59 (FIGS. 6 and 8) which guides a user through a format for describing a desired process model. In conjunction with the format, the interactive program 59 employs an expert system 61 (FIGS. 5 and 8) which maintains a state of completeness/incompleteness for the overall model as well as for each element. Specifically, the expert system 61 determines for each user insertion of input data correctness of the input data with respect to previously inserted input data. Correctness includes consistency of the currently inserted input data with respect to previously inserted input data on which it depends and consistency of the currently inserted input data with respect to the overall model such that specifications of model elements defined by previously inserted input data are not contradicted by specifications defined by the currently inserted input data.

Provided in FIGS. 2a-2j is a series of screen views generated by the interactive program 59 of the present invention at different stages within the format provided for specifying a desired model process. The particular order in which the screen views are herein presented is understood to be by way of illustration of the use and operation of the invention and not by way of limitation of the invention. The first major screen view generated by the interactive program 59 is main menu 13 shown in FIG. 2a. Main menu 13 provides an overview of the required and optional elements available through the format to form a desired model process. Each element is generally referenced by an identification name or descriptive phrase. The user selects the desired optional elements by name and provides desired specifications for each element (required and optional) through subsequent screen views.

The main menu 13 also provides an indication of which elements the user has given desired proper specification and for which elements the user needs to give desired specifications. For example, a pound sign next to the identification name of an element indicates that the user has given proper specifications for the element and hence that the element is "complete". Those elements for which the user needs to provide further specifications and thus are "incomplete" are indicated by an asterisk adjacent the identification name of the element. Collectively the asterisks and pound signs next to the identification names of the elements provide an indication of the state of completeness of the specification of the process model as a whole currently being defined by the user.

Prompts 15 are also provided in the main menu 13 and serve as directional information to the user. In particular, one prompt specifies that selection of a predefined function key (F4) on a keyboard 81 (FIG. 8) of the computer system 79 on which the interactive program 59 is running will proceed the user to the next step in the format as a function of completeness/incompleteness of the model. That is, the next screen view will provide directions toward completing the specification of a currently "incomplete" element. A second prompt lists other predefined function keys on the keyboard 81 and specifies the effect that selection of each indicated function key will provide. Specifically, depression and release of function key F1 provides a user with a help session on the presently displayed menu as a whole or on a selected element on the menu. Depression and release of function key F8 redisplays for the user the main menu 13 from any screen view. Depression and release of function key F9 causes the display of the screen view preceding the current screen view.

As illustrated in FIGS. 2b-2j, each screen view in the series of screen views similarly provides prompts 15 for obtaining user help with regard to the particular menu-/screen view currently displayed and/or with regard to a particular item/input field displayed on the current screen view. The other prompts 15 indicating the different functions associated with various function keys of the keyboard 81 as predefined within the interactive program 59 are also included on each screen view in a manner known in the art.

Figure 2A:
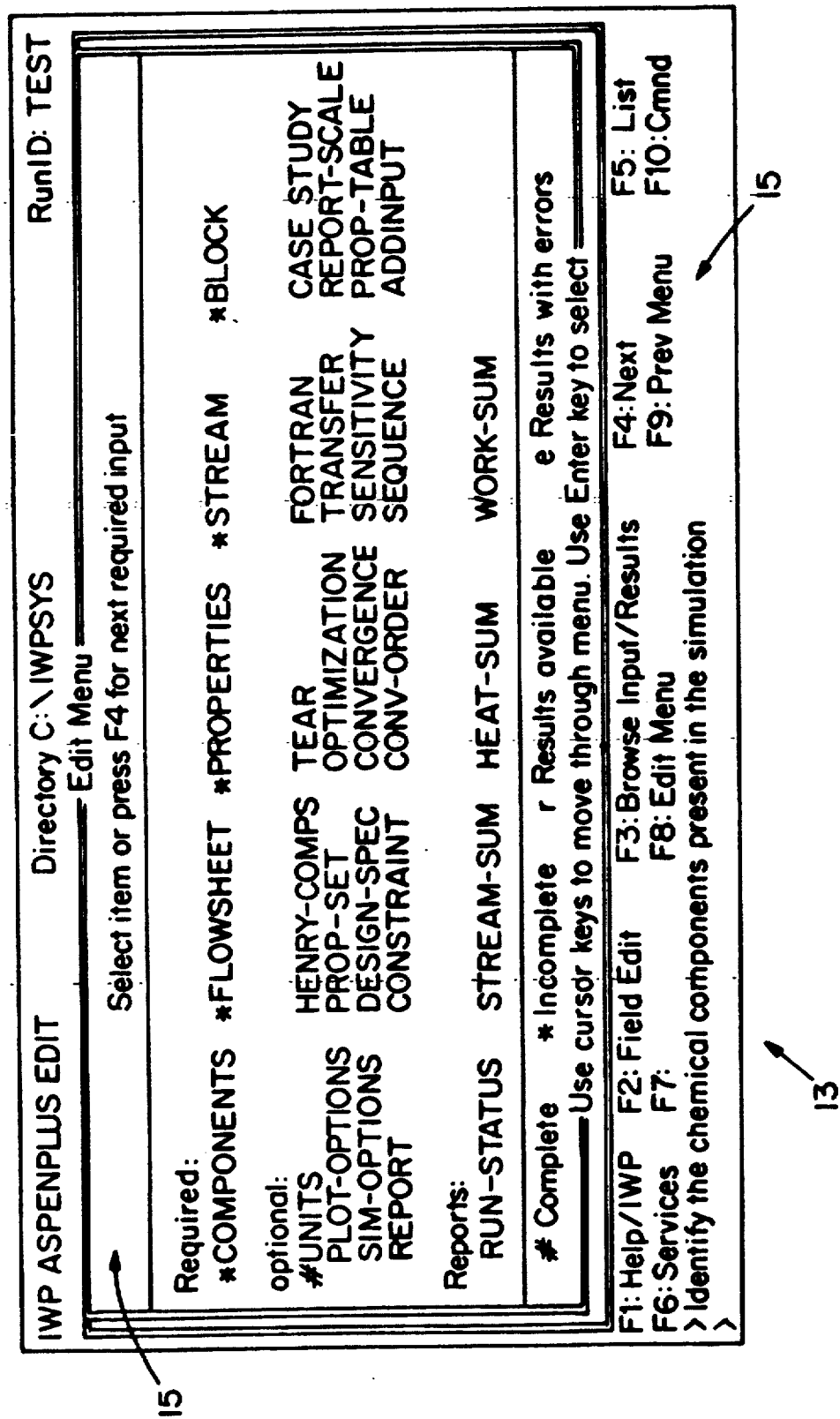
Figure 2B:
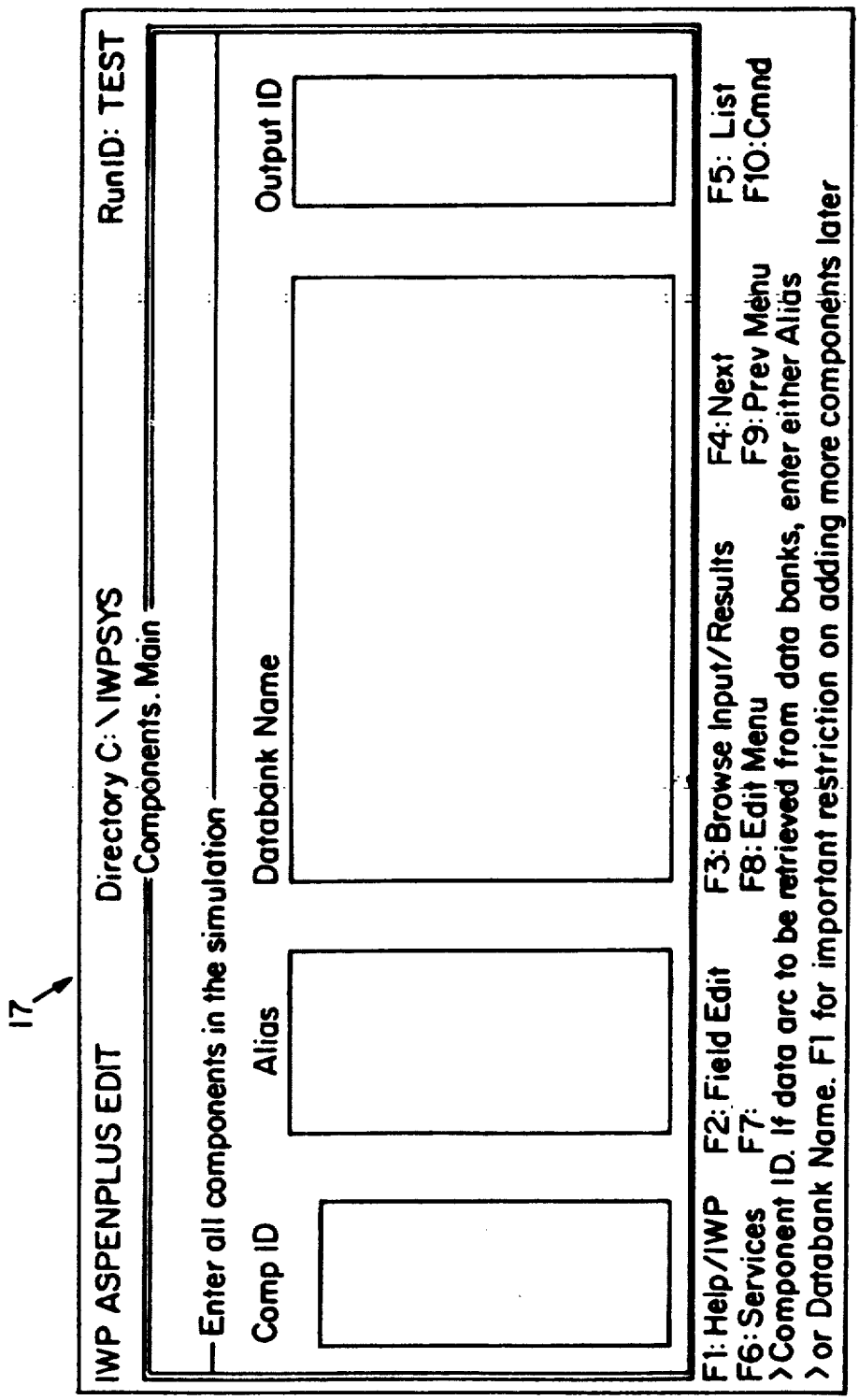

Upon selection of an element listed in the main menu 13 a subsequent screen view is generated as illustrated in FIG. 2b. In the case of the "components" element being selected from the main menu where the components element is "incomplete", the succeeding screen view is an input form 17 with input fields for holding desired user inserted input data. Each input field refers to a specification of the selected components element. Using the keyboard 81 as described above, the user moves the cursor from input field to input field and inserts the desired specification into each input field and/or the user selects function keys for desired respective effects.

Figure 2C:
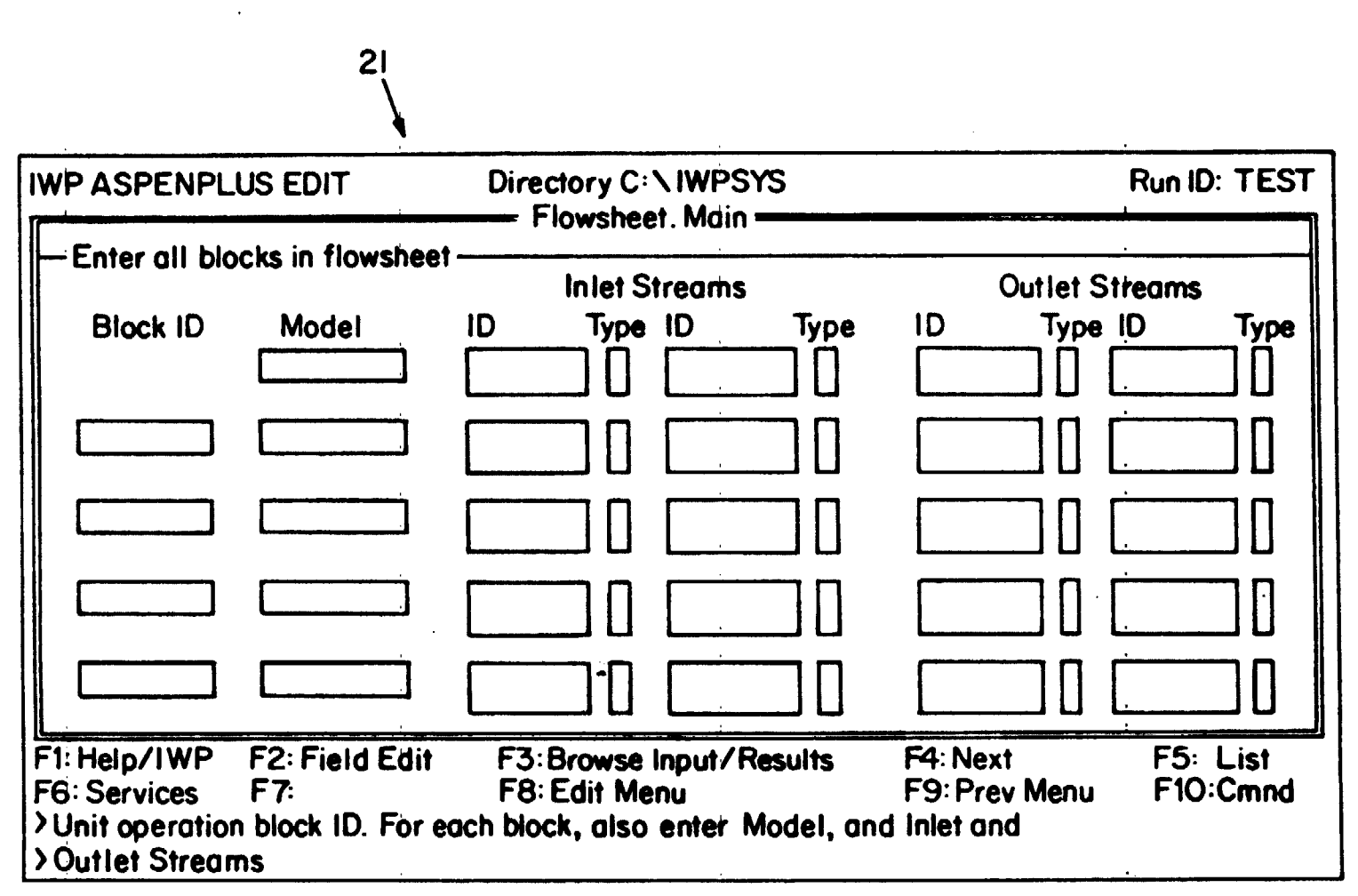

The screen views succeeding the main menu for the elements "flowsheet" and "properties" are input forms for those elements. The input forms have similar features to the input form for the "components" element described in FIG. 2b. The input form 21 for the "flowsheet" element is illustrated in FIG. 2c and provides input fields for initially defining (i.e. designating a name and type) desired blocks and streams in the model process. Further specifications of the user initiated blocks and streams are inserted on screen views which succeed the main menu with a selection of the respective "block" or "stream" element.

Figure 2E:
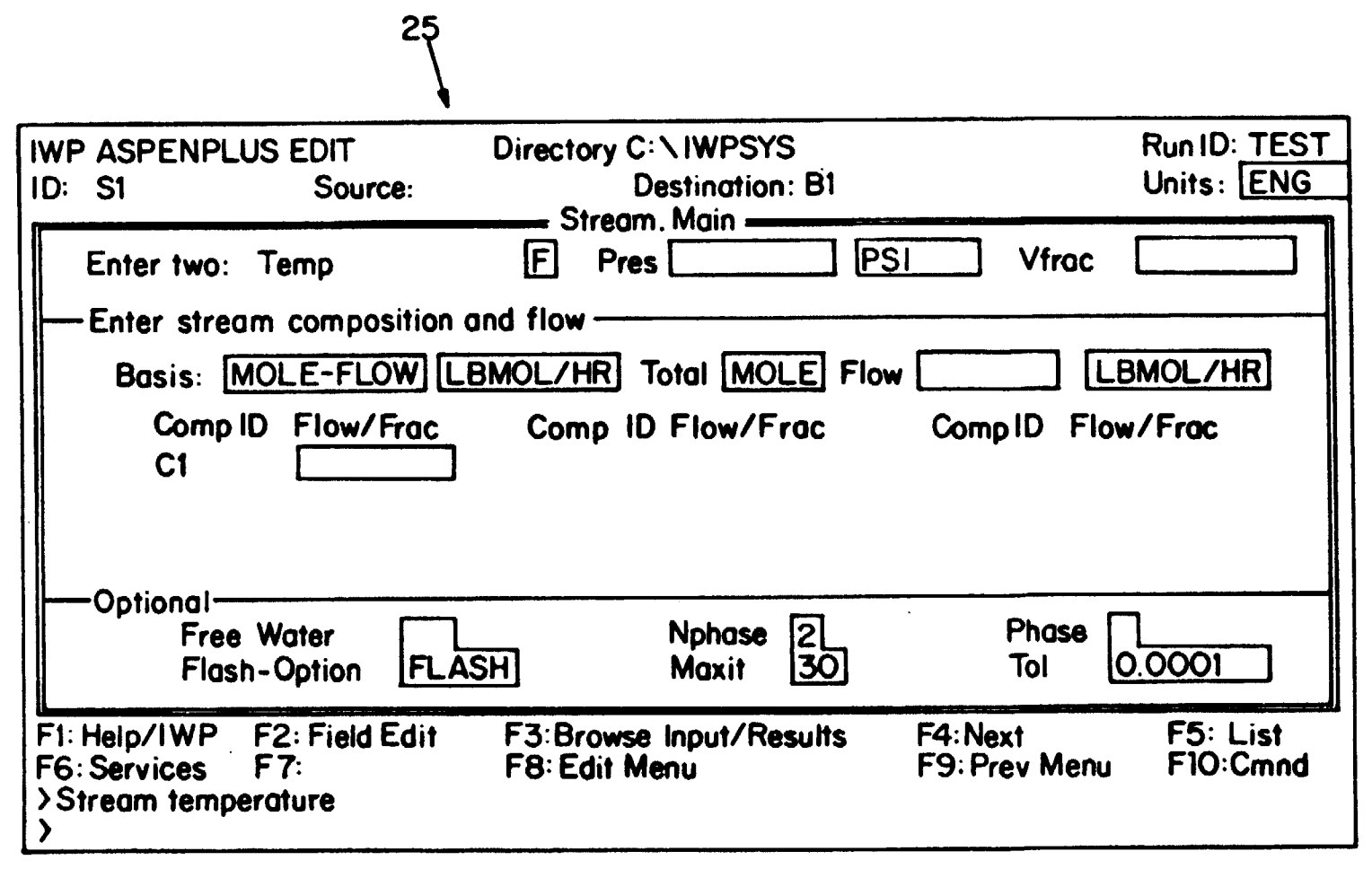

In the case of the "stream" element being selected from main menu 13 of FIG. 2a, the subseries of screen views is provided as illustrated in FIGS. 2d and 2e. As illustrated in FIG. 2d, the immediately succeeding screen view associated with the "streams" element of the main menu 13 is a submenu 23. The submenu 23 provides a listing of the streams which the user defined for the desired model process in the flowsheet input form 21 (FIG. 2c). Each stream is identified by the user provided name which is used throughout the menus and input forms to designate the particular stream as defined by the user. From the submenu 23, a particular stream may be selected through the cursor and keyboard 81 as previously described, and upon selection an input form for that stream is displayed. The displayed input form 25 provides input fields into which the user inserts specifications for that stream as shown in FIG. 2e. User completion of the input form for each stream is similar to completion of the other input forms for the other elements.

The series of screen views which succeed the main menu 13 upon selection of the "block" element is illustrated in FIGS. 2f and 2g. The "blocks" element has a submenu 27 which is similar to the streams submenu 23 in FIG. 2d. The submenu 27 as shown in FIG. 2f lists block names of blocks which were defined by the user for the desired model process through the flowsheet input form 21 of FIG. 2c. The submenu 27 also lists the possible types of blocks, for example, flash, pumps and distillation columns. Selection of any one of these types provides a screen view of another submenu which lists, by user assigned block name, the particular flashes, pumps or distillation columns respectively defined by the user in the flowsheet input form 21. Selection of a name of a block from that submenu or from the general block submenu 27 provides a screen view of an input form for that block.

Figure 2H:
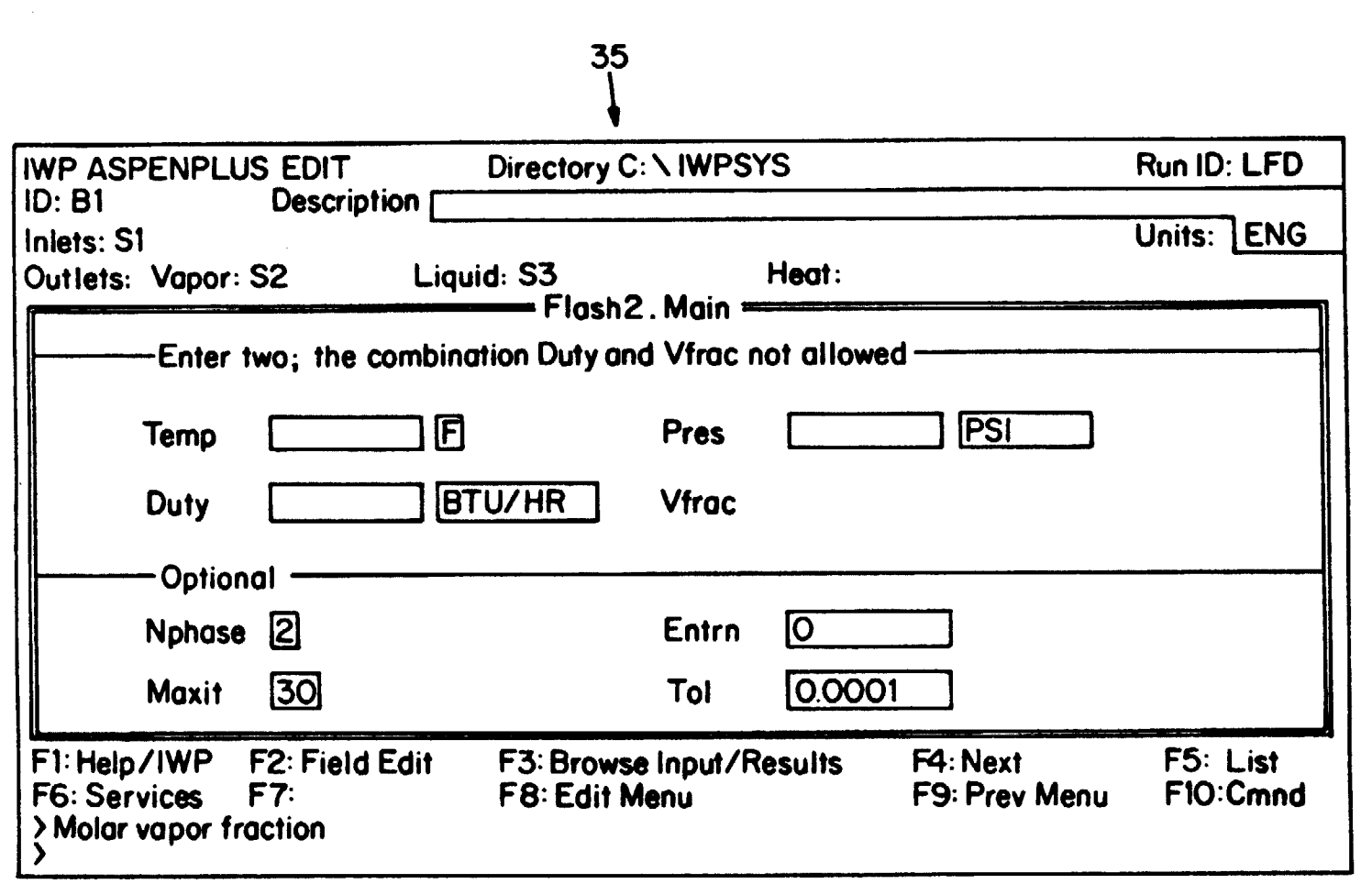
Figure 2J:
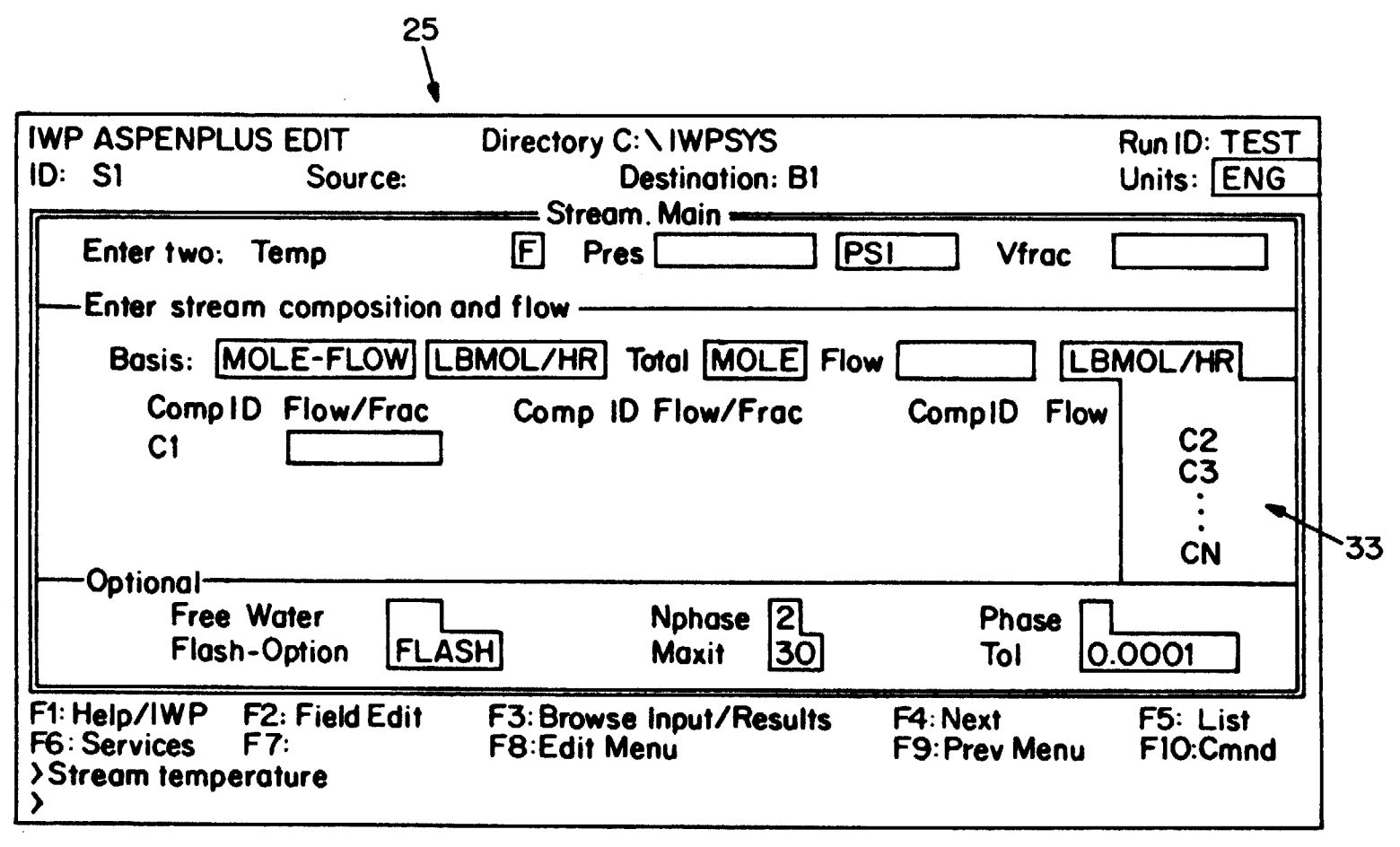

An illustration of a block input form for a user defined distillation column is shown in FIG. 2g. The block input form 29 provide input fields for defining the specifications of that distillation column. Similar input forms are generated for each block listed by name in general block submenu 27 and by type in submenus which succeed general submenu 27. An illustration of a flash input form 35 is shown in FIG. 2h, and an illustration of a pump input form 37 is shown in FIG. 2i. Completion of these input forms is as discussed previously.

For each input form, upon the insertion of user desired input data into an input field, an expert system 61 (FIG. 8) of the interactive program 59 analyzes the inserted input data for consistency with respect to the input field where the cursor is currently positioned and with respect to previously inserted input data. Upon a determination of an error in the inserted input data, the expert system 61 provides a prompt in the form of an error message on the screen view. The error message is written in everyday language to simply apprise the user of the determined inconsistency of the currently inserted input data with respect to previously inserted input data. The input field in which currently inserted input data, determined to be inconsistent, remains highlighted and the cursor is unable to be moved from that input field until the user inserts an acceptable specification in the input field.

An example of the foregoing is illustrated in FIG. 2g by the error message 31 "Value is out of range; it must be between zero and one" generated upon the user inserting 1.5 in the input field designated RDV. In addition, a prompt at 31 in FIG. 2g describing the RDV input field states "distillate vapor fraction RDV=DV/D. 0 for total condensers; $0 < RDV \leq 1$ for partial condensers". The prompt appears during the time in which the cursor is positioned in the RDV input field.

After the user has entered an acceptable value in the RDV input field, he is able to move the cursor to other input fields by arrow keys or the like on the keyboard 81. Preferably, the user is able to move the cursor directly to the next incomplete input field on the input form by depressing and releasing the Return or Enter key on the keyboard 81. Upon repositioning of the cursor to other input fields, other prompts appear at 31 and provide the user with details associated with that input field. When the user has inserted specifications in each input field which are determined to be acceptable by the expert system 61, the input form is considered to be successfully completed. Selection of the predefined function key F4 to proceed to the next step in the format will then generate a succeeding screen view associated with the next "incomplete" element from the main menu.

Also, during the insertion of user desired input data into input fields of an input form, the expert system 61 provides for the blocking of an input field which need not be used by the user as required by previously inserted input data. For instance, during the completion of the streams input form 25 (FIG. 2e) where two out of three input fields need to be completed for temperature, pressure and vapor fraction, upon completion of two input fields the expert system 61 provides for the dimming and locking of the third input field. To that end, the user is disabled from providing input data to the third input field and hence is prevented from over specifying in the desired model process.

Further, the expert system 61 allows the user to receive a listing of predefined acceptable input data particular to an input field. Specifically, as illustrated in the distillation column input form 29 (FIG. 2g) and stream input form 25 (FIG. 2e), an input field may require the name of a previously defined element or a predefined value from a list of possible values. In order for the user to refresh his memory as to the names of previously defined elements and/or predefined acceptable values, the expert system 61 provides a listing of such for the user upon user command. The listing may be in menu form as shown by the popup menu 33 in FIG. 2j in which the predefined values are all listed in one area of the screen before the user. The listing may also be in the form of one element name or value at a time in the input field which is of interest. In this case, the user may press a predefined function key, such as a tab button, on the keyboard which provides for the scrolling through the list of predefined elements, one element name at a time, in the input field. In a third manner of providing a list of acceptable element names or values for the input field, the user requests a sublist of such element names or values. The sublist appears in the same fashion as the full list menu but with the limited number of elements/values as requested by the user.

Selection of an element or value from the sublist or full list menus is by common methods, preferably by positioning the cursor on the displayed value or name of the desired element and subsequently depressing and releasing an Enter or Return key. After a selection is made, the input form is displayed with the selected value/element name in the subject input field and the menu (full list or sublist) not appearing.

Figure 3:
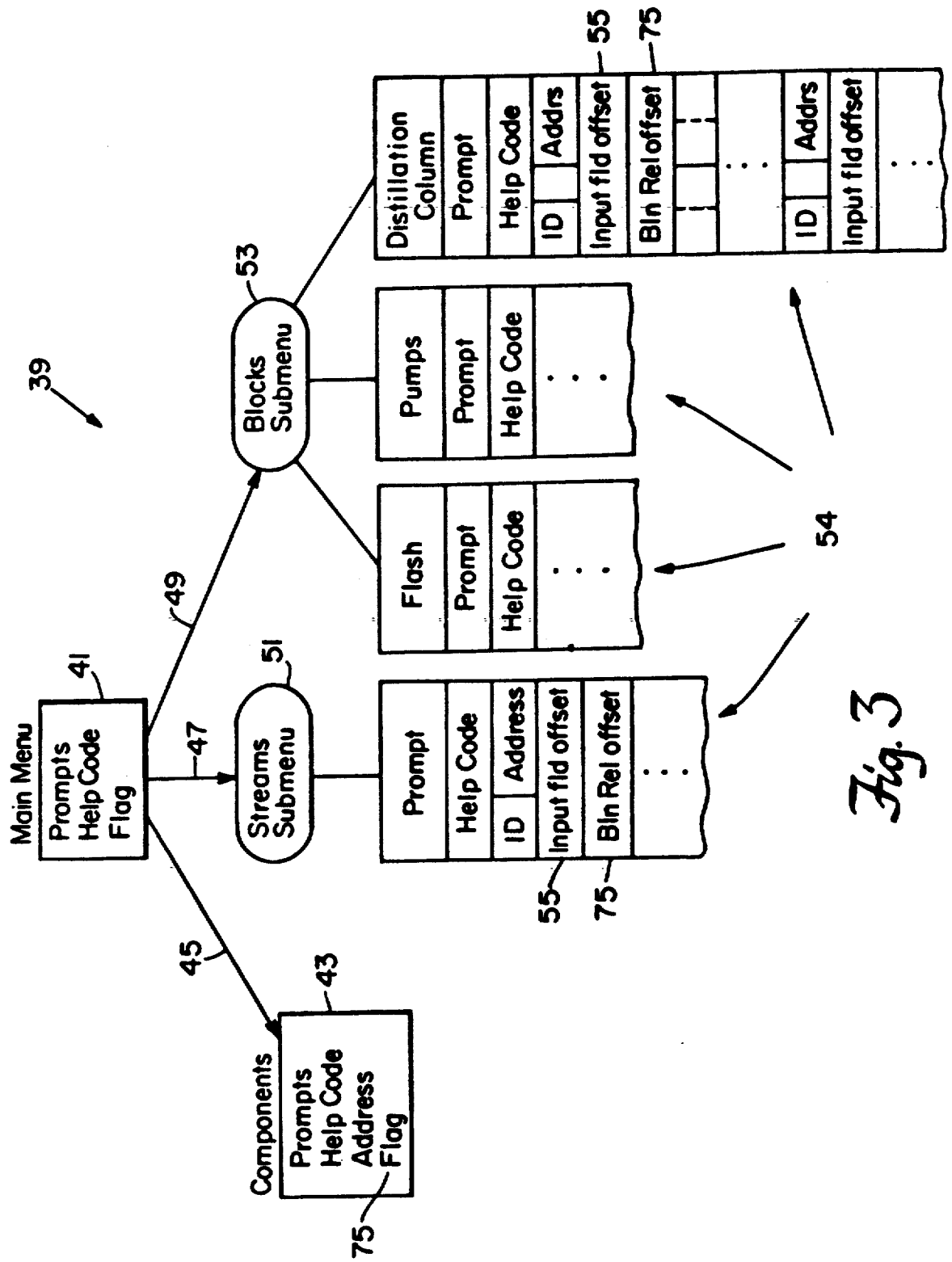
FIG. 3 is a diagram of a tree structure used in the present invention to order the screen views of FIGS. 2a-2j.
Figure 5:
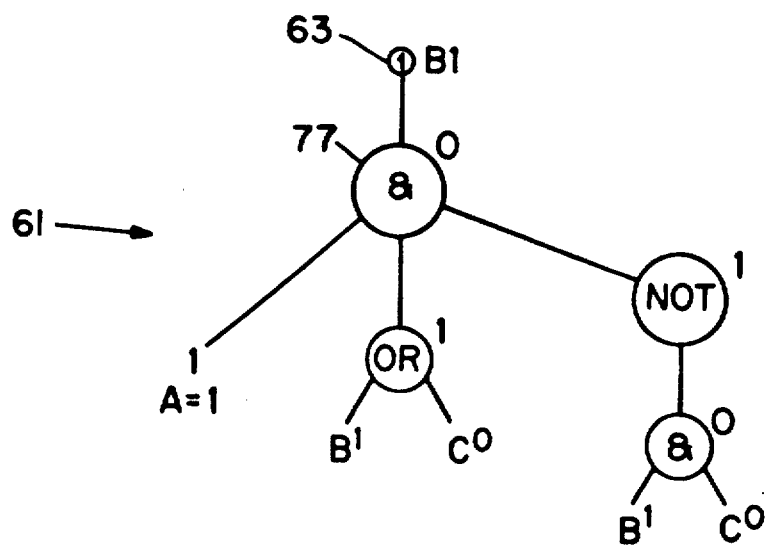
FIG. 5 is a diagram of a consistency tree structure for providing a trace mechanism and expert system features of the present invention.

To provide the foregoing features the interactive program 59 of the present invention employs two general data structures described in FIGS. 3 and 5. The first data structure 39 orders the series of screen views displayed to the user through the video display and is illustrated in FIG. 3. The data structure 39 is generally a tree of nodes connected by branches or pointers. Each node catalogues information about a screen view which corresponds to that node, and each node points to either a subtree whose nodes corresponds to succeeding screen views or a node at the end of a branch, referred to as a record, which corresponds to an input form.

As previously mentioned, the major screen view, (i.e. main menu 13) provides an indication of all the required and optional elements available to the user to specify a desired model process along with certain prompts. The head node 41 corresponds to the main menu 13 and stores the necessary information for displaying main menu 13 including screen format, prompts and a help code which designates pertinent help messages whose actual text is stored in a separate memory area. Pointers, 45, 47, 49 indicating succeeding screen views are also provided in head node 41.

In the preferred embodiment, the required elements displayed on the main menu 13 are "components", "streams" and "blocks". The screen views displayed upon selection of the required elements are represented by a record or nodes at the end of the three branches/pointers 45, 47, 49 which extend from the head node 41 in the data structure 39 of FIG. 3. The record 43 at the end of the "components" branch 45 identifies the screen view of the components input form 17 on which the user inserts specifications of various components for the desired model process. Also, the record 43 provides the prompts of the components input form 17 along with a help code which designates the respective help message in the separate memory area mentioned above. In addition, record 43 indicates the memory address of the memory area where data inserted into the components input form is stored.

The "streams" branch 47 and the "blocks" branch 49 are similar in that they each point to a subtree. The beginning node 51 of the "streams" subtree holds the necessary information for displaying the streams submenu 23 (FIG. 2d) including prompts and a help code for pertinent user help messages. The beginning node 53 of the "blocks" subtree similarly holds the information necessary to display the "blocks" submenu 27 of FIG. 2f. Beginning nodes 51, 53 also provide pointers to records 54 which correspond to streams input form 25 and the various blocks input forms (e.g. Distillation Columns input form 29, Flash input form 35 and Pumps input form 37) respectively.

Each record 54 provides the necessary information to display its corresponding input form with prompts and help messages upon user command. Each record 54 also holds a memory address to the actual memory area in which the data that the user inserts on the corresponding input form is to be held. The position in the record of the data inserted in the first input field of the input form is designated by an actual byte offset 55 provided in record 54. Other information which is held in record 54 is described later. Records 54 hold similar information for each element of a certain type (e.g. stream, flash, pump, distillation column) specified through the respective input forms 25, 29, 35 and 37.

The pattern of branches, nodes and records of data structure 39 is duplicated in the memory area which corresponds to the memory addresses referenced in data structure 39, so that a corresponding record construct (i.e. a record structure) resides in memory at the address indicated by the components record 43, distillation column record 54, for example, and so forth. Although arranged in the same manner as the nodes and records of data structure 39, the nodes and records of the duplicate structure have different contents than their corresponding nodes and records in data structure 39. The branches, nodes and records of the duplicate structure are illustrated in data tree 65 of FIG. 4 and further described in conjunction therewith.

In general, the nodes and records of data tree 65 hold identification names and specifications of elements inserted by the user during the screen view which corresponds to the node or record. In the case of block records 67 which correspond to block records 54 of data structure 39, a first field 69 holds the user inserted name such as B1. A second field 71 holds the data the user inserted into the first input field of the corresponding displayed input form. The second field 71 begins at the Nth byte of record 67 where N is the offset value 55 provided in the corresponding record 54. The second field 71 also employs a pointer to indicate the byte in the record 67 which holds data inserted into the second input field of the corresponding displayed input form. Other bytes which hold data inserted into other input fields of the displayed input form are similarly pointed to by the byte holding user inserted data for a preceding input field of the input form.

Thus, while the memory space for records and the addresses for accessing records and bytes therein are allocated by data structure 39, the actual user inserted data for each record is held in data tree 65. To that end data structure 39 serves as a record or data definition tree and duplicate structure 65 is a data tree. It is the use of these two trees which enables a variety of model processes to be specified and which enables the number of records for streams and blocks within a model process to be dynamically defined according to user specification of a certain number of streams and blocks in the flowsheet input form 21.

Each input form illustrated to the user through the video display when properly completed represents a record of input data for the input file as shown in FIG. 1. For each input form/record, and node of the data tree 65 of FIG. 4, there is an associated binary flag 73 which indicates whether the record or node, respectively, is complete or incomplete. Completeness of each input form/record depends on the input data inserted in the input form. Completeness of a node depends on completeness of all input forms extending therefrom (i.e. identified by associated branches and/or subtrees). Ultimately when all records/input forms and nodes are complete, then the binary flag associated with the main menu indicates that the desired model process is completely specified and that there is a complete input file describing the model process for simulation purposes.

The binary flag 73 of each input form is assigned a value of "complete" or "incomplete" through an analysis which employs the tree-like structure illustrated in FIG. 5. The tree-like structure represents a Boolean statement that describes the various combinations of the input fields which make the input form/record complete. The various combinations and, hence, the tree-like structure are predetermined according to mathematical relationships used in the process engineering art. Such a treelike structure is hereinafter referred to as a consistency and completeness tree 61. The particular construct of the consistency and completeness tree 61 for each input form/record is provided in records 43, 54 of record definition tree 39. Access to actual binary values of elements in the tree and the value of the binary flag 73 is also provided in data definition tree 39 by a respective byte offset relative to the record 67 memory address.

An example for purposes of understanding tree 61 is as follows. The tree structure 61 of FIG. 5 provides the Boolean statement that the B1 record, for example, is completed only when acceptable input data has been inserted into the B or C input field along with a value of one having been inserted into the A input field, and input data has not been inserted into both the B and C input fields. A top node 63 of the tree structure 61 indicates when the statement holds true according to inserted input data and when the statement does not hold true, and hence when the B1 record is complete or not. Each Boolean function (e.g. OR, AND, NOT) stated in the Boolean statement is represented by a node of the tree. Each variable of the statement (i.e. the A, B and C input fields) are represented as elements of the nodes in the tree structure 61. These parts and their interrelationships are indicated in record definition tree 39.

Each node and each variable has a binary flag (shown as a superscript "0" or "1") indicating whether the variable has been defined by user inserted input data and whether the variables extending from a node have the relationship designated by the node. The actual "0" or "1" value of each flag is held in a respective position of the pertinent record in data tree 65.

Each node may also contain a common language message. The use of this message will be described later.

When the user inserts input data into one of the input fields represented in the tree structure 61, the program 59 of the present invention updates the tree 61 accordingly. Once the user inserts a value of one in the A field, the associated variable in the tree structure 61 is assigned a flag indicating true (or "1"). Similarly, once an acceptable value has been entered by the user into the B field and not the C input field then the flags of the associated B and C variables of the tree structure 61 are updated accordingly to indicate true ("1") and false ("0") respectively. The part of the Boolean Statement requiring input data to have been inserted into either the B or C field is thus satisfied and the node indicating the "OR" Boolean function is assigned a flag value of true ("1"). Meanwhile, the part of the Boolean Statement analyzing whether input data has been inserted into both the B and C fields is indicated by the branch on the lower right hand side in the illustration of FIG. 5. The "AND" node is assigned a flag value of false ("0") because input data has not been inserted into both B and C input fields. The AND node assigned the flag value of false is a branch under a "NOT" node function which is assigned a flag value of true because the depending branch (i.e. the statement "B AND C") was determined to be false. Hence, the three values converging at the upper AND node 77 are all true which causes the upper AND node 77 to be assigned a flag value of true ("1"). The head node 63 representing the completion of the B1 record thus indicates true ("1").

Figure 4:
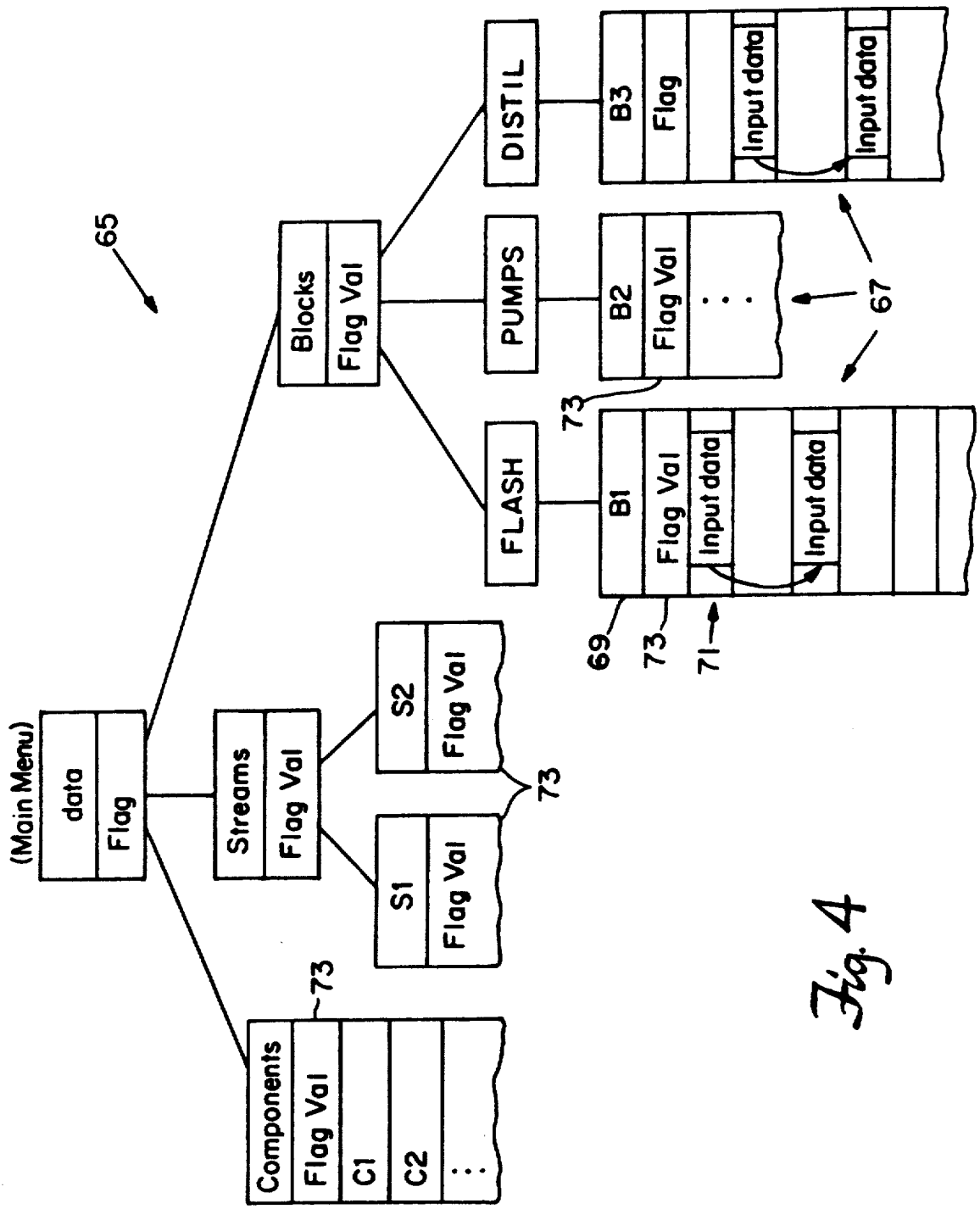
FIG. 4 is a diagram of a tree structure generated during use of the present invention to hold user inserted data.

Once an individual tree structure of FIG. 5 is analyzed for each record/input form, the associated flag 73 for that input form in the data structure of FIG. 4 is assigned the value of the top node 63 of the tree structure of FIG. 5 to indicate the state of completeness of the record/input form. Individual consistency and completeness tree structures 61 for the other input forms are similarly analyzed and determine the value of the flag associated with the input form in the data structure 65 of FIG. 4, and collectively the values of the flags of the data structure of FIG. 4 indicate the state of completeness of the whole model (i.e. the input file).

In the preferred embodiment, the Boolean functions include AND, OR, NOT, AT LEASE N OF, and EXACTLY N OF, where AT LEAST N OF is true if an integer number N of depending variables are true and EXACTLY N OF is true if an integer number N of depending variables are true. Also nodes in a lower portion of a tree 61 may be relational operators including equal to, less than, greater than, less than or equal to, greater than or equal to, and not equal to. Elements or variables of these nodes are numeric values or named symbols.

In addition, certain nodes must always have a value of true thus constraining the combination of values of variables to or dependent on that node. Such nodes are referred to as "constraining nodes" and are more fully described later.

Figure 6:
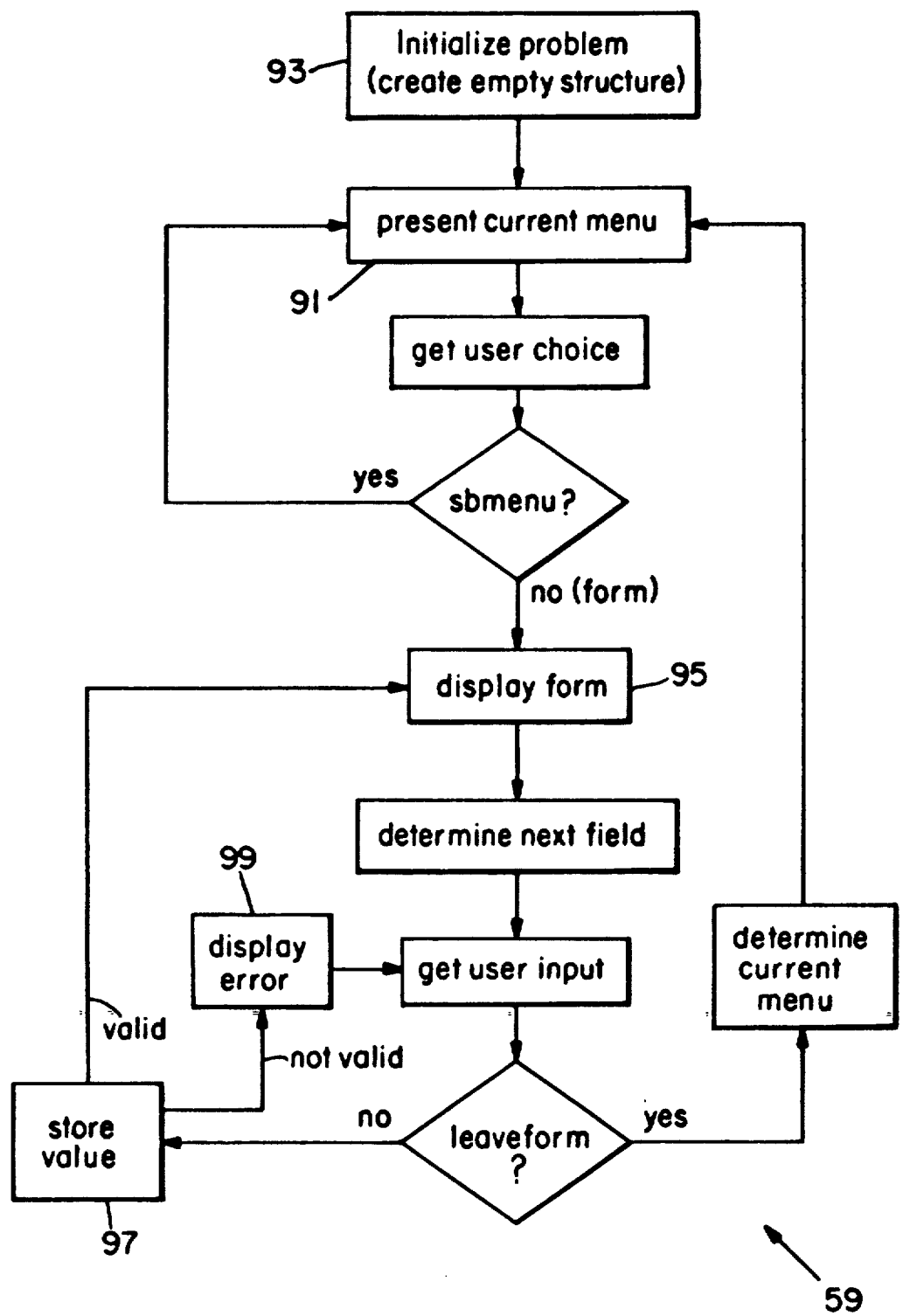
FIG. 6 is a flow diagram of the interactive program embodying the present invention.
Figure 7:
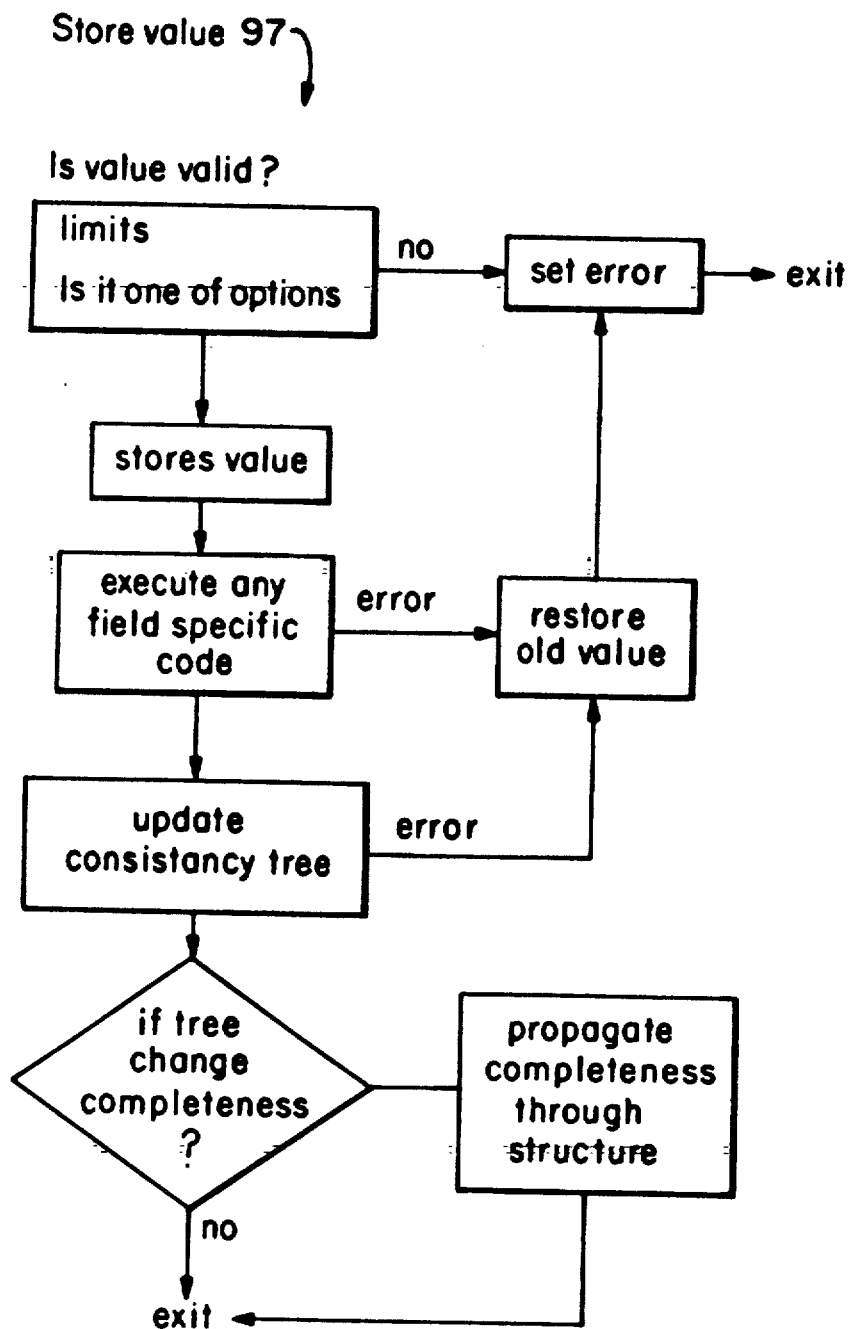
FIG. 7 is a flow diagram of a routine employed in the interactive program of FIG. 6.

FIGS. 6 and 7 provide a general flow chart of the operation of the interactive program 59 of the present invention. As shown in FIG. 6, the first step 93 of the interactive program 59 initializes the tree structures 61 and 65 of FIGS. 4 and 5. In particular, all binary flags are set to false (i.e. zero) if the record is required or neither (i.e. −1) if the record is optional. The interactive program 59 then displays, at 91, the pertinent menu on the video display 83 (FIG. 8) by methods known in the art. In the first occurrence, this will be the main menu 13 of FIG. 2a. From the main menu the user selects a required element or an optional element. From the user selection the interactive program 59 traverses the branches in the data structure 39 of FIG. 3 to provide the next sub menu represented by a branch of the data structure or an input form represented at the end of a branch of FIG. 3. In particular, if "streams" or "blocks" is chosen by the user during the display of the main menu, then the program provides the respective sub menu 23, 27. If the "components" element is chosen by the user during the display of the main menu, then the components input form 17 (FIG. 2b) is subsequently displayed.

Once the user has made choices from menu to sub menu which result in the display of an input form at 95, then the program 59 places the cursor on and highlights the first input field of that input form by methods known in the art. Upon the user moving the cursor to another input field, the program 59 determines into which input field the user has moved the cursor and will be currently inserting data. Once that field is determined, the field is highlighted and the user inserts desired input data in that field. If the user inserted input is a signal generated by the F4, F8 or F9 function key which in turn is interpreted as a request to leave the currently displayed input form, then the processor 79 (FIG. 8) determines according to the signal generated the respective screen view (i.e. next incomplete input form, main menu 13, or previous submenu or menu) to be displayed and displays that screen view on the display screen. If the present user inserted input data is not a request to leave the current input form, then the input data is interpreted according to the input field in which the input data was inserted. A routine 97 to store the user inserted input data is then performed as described in detail in FIG. 7.

After the routine 97 to store the input data is performed, an error flag indicating whether the input data was valid or not is checked. If the input data is determined not to be valid, a pertinent error message is displayed to the user at 99 and the input field in which the input data was inserted remains illuminated with the incorrect data and the cursor in position for reinsertion of input data in that field on the input form. The processor 79 (FIG. 8) thereafter waits for the user to reenter desired input data in that field of the input form and does not allow the user to move the cursor out of that field until the inserted data is corrected.

If the input data was determined to be valid, then the input form is displayed with the cursor in the next input field to receive input data and that input field highlighted. The input field into which the user just entered input data is dimmed to indicate that the input field is satisfied.

The routine 97 to store user inserted input data is outlined in the flow chart of FIG. 7. The routine 97 first determines whether the inserted input data is valid. Validity is determined according to data type and value limits defined in the record definition tree 39 for the input field in which the subject input data was inserted. If the inserted input data is an integer or real number then the value of the input data is checked with respect to the limit defined in the record definition tree 39 which is predetermined from known equations and scientific standards of the art. If the inserted input data is a character string or a symbol, then it must be found to have been previously defined (i.e. by user insertion such as an element name, or by preprogrammed initialization). Common memory search and/or storage methods are used. In addition, such character string recognition and usage supports the recall mechanism for listing or enabling a user to "tab" through a list of usable named elements. If the value of the inserted input data is not within respective limits or the character string is not found to have been predefined then the input data is determined to be invalid and a pertinent error message is displayed at 99 in FIG. 6. If the input data is valid, then the routine 97 stores the value in the respective record, in the preallocated byte therein, in data tree 65 which is ultimately used to form the input file.

Upon storing the input data in data tree 65, the consistency and completeness tree 61 is checked in the following manner. All variables of tree 61 which correspond to the input field into which the subject input data was inserted is temporarily assigned a flag indicating true. The node to which the variable depends is checked to determine whether its flag is affected by the now true flag of the variable. If so, the node flag is temporarily changed and other similar temporary changes propogating up the tree 61 from the node are made accordingly. If the changes effect a constraining node such that its flag cannot consistently have its requisite value of true then an error flag is set. The error message to be displayed is the message contained in the constraining node.

After storing the value in routine 97, any field specific code corresponding to the current input field is executed. If the field specific code provides an error message, then the respective record byte in data tree 65 is restored to its value previous to the insertion of the current input data. The program 59 then returns to displaying the error message and the input form at 99 in FIG. 6.

If the field specific code is executed without error then the consistency and completeness tree 61 of the subject record of data tree 65 is updated. Updating begins with the flag of top node 63 of tree 61 and employs the temporarily assigned flag values. The consistency and completeness tree 61 of each input form/record is traversed in a manner which changes the flag values of the nodes according to the temporary flag values of the variables as affected by the input data. In the case of a constraining variable or node, the depending branches are checked to make sure that the input data does not violate any predefined parts of the tree and to subsequently dim the input field corresponding to the constrained value in that input form/record. The message contained in the original constraining node is displayed as the prompt when the user moves the cursor onto the dimmed input field.

For example, the "B AND C" part of the tree 61 of FIG. 5 is affected where input data is inserted only into the B input field. The flag of the "AND" node between the B and C variables was previously assigned a temporary value of not true since input data for both B and C input fields have not been entered. Similarly, the flag of the next node, a constraining node, above the "AND" node was previously assigned a temporary flag value of true the "NOT" of the flag value of the "AND" node. Because the "NOT" node is a constraining node, its branch to the "AND" node is traversed. It is determined whether the flag value of the constraining node would change if the flag value propogated along that branch changed. If so, then the constraint is passed down making the same determination of whether the current node flag value would change if the flag value of the currently traversed branch extending therefrom changed, until the end of the tree is reached (i.e. a lower level variable, such as variable "C"). If a change in the flag value of that variable would cause a change in the flag value of the constraining node then that variable is "locked". That is, to ensure the constraint that the Boolean Statement "B AND C" is not to have a value of true, the program 59 dims and "locks" the input field corresponding to the C variable of the tree such that no input data for the C input field is entered against the constraint of that part of the tree where the value of the Boolean statement of "B AND C" is to remain not true.

In the case where the error flag was previously set, an error message is provided on the screen view, the original value of the respective record byte in data tree 65 in which the currently inserted input data was inserted is restored, and the program 59 is returned to the display error step 99 of FIG. 6.

If the changes in the flag values in consistency and completeness tree 61 of FIG. 5 cause the head node 63 of the tree to be assigned a new value, then the value of the flag of the corresponding input form in the data structure of FIG. 4 is changed accordingly. If any flags of the data tree 65 of FIG. 4 changed, then the data tree is traversed to update any affected branches by the change in completeness of a part of the data structure. Once the data tree 65 of FIG. 4 has been updated as necessary then the program 59 resumes as described above in FIG. 6.

As described by the foregoing a single main menu is used to indicate to the user the completeness of the desired process model. Completeness is indicated on each menu thereafter and in each input form. Hence, the user is provided with an indication of which parts of the model as well as which elements of the model are complete or need further specification. Along with such indication of completeness, the user is automatically provided with error checking on an input data by input data basis for each input field in which input data is inserted by the user.

In addition, the interactive program 59 provides various help mechanisms for the user. Input field specific help is provided by prompts on each screen view. The prompts provide the user with an indication of the field which is unsatisfied or which was provided with invalid input data and thus needs to be corrected. Further, help information available upon user command includes an in depth explanation to the user of the input form which is currently displayed and the input fields on which the cursor is currently positioned. Thus, the help information changes from one displayed screen view to the next. Upon user request a listing of possible valid input data for a specific input field is provided in various forms. In one form, the user is provided with a list of the available valid input data. In a second form, the user is provided with one entry at a time of the list of available valid input. A sub list of the list is also provided upon user request of all elements with a common feature (such as common first three letters of a name).

Similarly, predefined available valid input may be provided to the user.

The trace mechanism of the present invention is implemented by the consistency and completeness tree 61 of FIG. 5. The trace mechanism prevents overspecification, by locking certain input fields in some instances, as well as prevents inconsistent specification with respect to previously entered input values and predefined relationships as are well known in the art.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. An input system for a computer-based model process simulation device, the input system comprising:

computer means;

video display means coupled to the computer means;

means for communicating to the computer means;

an ordered series of menus and input forms displayable on the video display and stored in the computer means, each menu having prompts such that the series of menus directs a user to the input forms, each input form having a plurality of input fields for receiving different user selected input data inserted by the user through the means for communicating to the computer means, and providing prompts corresponding to the input fields, the prompts on each form and menu being changeable as a function of input data inserted by the user on the forms;

processor means including software routines coupled to the computer means and having access to the menus and input forms, the processor means for generating an input file from the inserted input data and for each user insertion of input data (i) determining a current amount of completeness of the input forms, for each form, amount of user inserted input data to complete the form changing as a function of content of input data inserted by the user into various input fields and (ii) determining correctness of the inserted input data with respect to input field into which the input data has been currently inserted and input data inserted by the user into other input fields before the current insertion, such that input data determined to be correct is inserted into the input fields of the forms to establish a complete input file for a process simulation device and a highest amount of completeness of the input forms; and a display data structure coupled to the processor means for generating on the video display a changeable subset of the ordered series of menus and input forms in response to the current amount of completeness determined by the processor means, the menus of the subset directing the user to the forms of the subset, the forms of the subset providing to the user the input fields with corresponding prompts to insert input data necessary for establishing a complete input file, the processor means determining the current amount of completeness with each user insertion of input data on a form, and the display data structure changing the subset of menus and forms in response to each determination of the current amount of completeness by the processor means.

2. An input system as claimed in claim 1 further comprising:

means for displaying on the video display, upon user command, an indication of possible input data which is correct with respect to an input field.

3. An input system as claimed in claim 2 wherein the means for displaying an indication provides a list of predefined acceptable input data with respect to an input field.

4. An input system as claimed in claim 2 wherein the means for displaying an indication includes a recall mechanism for recalling input data which was inserted by the user into other input fields and determined by the processor means to be correct.

5. An input system as claimed in claim 4 further comprising a trace routine performed by the processing means to determine correctness of currently inserted input data by comparing the currently inserted input data of one input field with previously inserted input data of other input fields, the currently inserted data being determined to be correct where it matches previously inserted input data of at least one of the other input fields.

6. An input system as claimed in claim 1 further comprising a trace routine performed by the processing means to determine correctness of currently inserted input data by comparing the currently inserted input data of one input field with previously inserted input data of other input fields, the currently inserted input data being determined to be correct where it matches previously inserted input data of at least one of the other input fields.

7. An input system as claimed in claim 1 wherein the processor means generates on each menu and input form an indication of the current amount of completeness.

8. An input system as claimed in claim 1 wherein the processor means, after determining currently inserted input data to be incorrect, discards the currently inserted input data and displays on the video display an indication of the incorrectness of the currently inserted input data.

9. An input system as claimed in claim 1 wherein the processor means prevents input data from being inserted into certain input fields depending on input data which was inserted in other input fields and determined to be correct.

10. An input system for a model process simulation device, the model process simulation device controlled by computer means and having (i) a video display coupled to the computer means and (ii) means for communicating to the computer means, the input system comprising:

an ordered series of screen views supported by the computer means and displayable on the video display for user viewing therefrom, the ordered series of screen views providing an arranged course for user entry of desired data to form a complete input file, amount of user entered data to form a complete input file being a function of content of data entered by the user along the arranged course, each screen view providing to a user a state of completeness of the input file and prompts directing the user through the arranged course, at least one screen view providing input fields for receiving data provided by the user through the means for communicating to the computer means and prompts corresponding to the input fields;

processor means including software routines, coupled to the computer means and having access to the screen views, for forming an input file from user provided data, the processor means determining correctness of data currently provided by the user for one input field according to data which was provided by the user for other input fields and if correct, updating the state of completeness provided by each screen view according to both currently and previously user provided data, a complete state being established upon the formation of a complete input file; and a display data structure coupled to the processor means for enabling on the video display a display of a changeable subset of the ordered series of screen views in response to the updated state of completeness, the subset providing that portion of the arranged course for user entry of data necessary to enable a complete input file to be formed from data provided by the user thus far, the processor means updating the state of completeness with each user entering of data in a screen view of the subset, and the display data structure enabling change of the subset in response to each updating of the state of completeness by the processor means.

11. An input system as claimed in claim 10 further comprising means for displaying on the video display, upon user command, an indication of possible data which is correct with respect to an input field.

12. An input system as claimed in claim 11 wherein the means for displaying an indication provides a listing of predefined acceptable data with respect to an input field.

13. An input system as claimed in claim 11 wherein the means for displaying an indication includes a recall mechanism for recalling user provided data which was provided for other input fields.

14. An input system as claimed in claim 10 further comprising a trace routine performed by the processor means to determine correctness of currently user provided data by comparing the currently provided data of one input field with previously user provided data of other input fields, the currently provided data being determined to be correct where it matches previously user provided data of at least one of the other input fields.

15. An input system as claimed in claim 10 wherein the processor means, upon determining currently user provided data to be incorrect, discards the currently user provided data and displays on the video display an indication of incorrectness in the screen view which was displayed during user provision of the currently user provided data.

16. An input system as claimed in claim 10 wherein the processor means prevents data from being provided for certain input fields depending on data which has been provided for other input fields and determined to be correct.

17. A method of forming an input file for a computer controlled model process simulation device, the steps comprising:

displaying on a video display, controlled by computer means, an ordered series of menus and input forms such that the ordered series of menus directs a user to the input forms;

providing on the forms input fields for receiving different user selected input data provided by the user through an input device coupled to the computer means;

for each user provision of input data, (i) checking correctness of the provided input data with respect to the input field for which the input data was provided and input data provided by the user for other input fields, (ii) determining a current state of completeness of the input forms, a complete state being determined upon provision of acceptable input data for respective input fields such that a complete input file is formed from the provided input data, for each form, number of input fields for which user provision of input data is needed to complete the form changing as a function of content of input data provided by the user for various input fields, and (iii) changing a changeable subset of the ordered series of menus and input forms such that the menus of the subset direct a user to the forms of the subset, the forms of the subset providing to the user input fields for input data necessary for forming a complete input file; and displaying on the video display the changeable subset upon user command.

18. A method as claimed in claim 17 further comprising the steps of:

providing prompts on the menus and input forms; and changing prompts on the menus and input forms as a function of input data provided by the user on the forms.

19. A method of forming an input file for a computer controlled model process simulation device, comprising the steps of:

displaying on a video display, controlled by computer means, an ordered series of screen views to provide an arranged course for user entry of data for forming a complete input file, at least one screen view providing input fields for receiving data entered by the user through an input device coupled to the computer means;

providing to a user on each screen view a state of completeness and prompts directing the user through the arranged course;

determining correctness of data currently entered by the user for one input field according to data which was entered by the user for other input fields, and if correct, updating the state of completeness provided by each screen view, a complete state being established when a complete and error free input file is formable from the user entered data, amount of user entered data to form a complete input file being a function of content of data entered by the user along the arranged course;

forming a changeable subset of the ordered series of screen views in response to the updating of the state of completeness, the subset providing that portion of the arranged course for user entry of data necessary to enable a complete input file to be formed with data entered by the user thus far;

displaying the subset upon user command;

updating the state of completeness with each user entry of data in a screen view of the subset; and changing the subset in response to each updating of the state of completeness.

20. A method as claimed in claim 19 further comprising:

providing on said at least one screen view prompts corresponding to any input fields thereon; and changing the prompts as a function of user entered data.

* * * * *